United States Patent
Chen et al.

(10) Patent No.: US 12,474,975 B2
(45) Date of Patent: Nov. 18, 2025

(54) RESOURCE TAPPING METHOD, RESOURCE TAPPING APPARATUS AND ELECTRONIC DEVICE

(71) Applicant: Beijing Baidu Netcom Science Technology Co., Ltd., Beijing (CN)

(72) Inventors: Xiaoming Chen, Beijing (CN); Yongfeng Ji, Beijing (CN); Zhe Li, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 479 days.

(21) Appl. No.: 17/992,550

(22) Filed: Nov. 22, 2022

(65) Prior Publication Data
US 2023/0092978 A1    Mar. 23, 2023

(30) Foreign Application Priority Data

Nov. 23, 2021  (CN) .......................... 202111393506.X (51) Int. Cl.
*G06F 9/50*    (2006.01)
*G06F 1/28*    (2006.01)
(Continued)

(52) U.S. Cl.
CPC .............. *G06F 9/5094* (2013.01); *G06F 1/28* (2013.01); *G06F 1/3206* (2013.01); *H05K 5/0247* (2013.01)

(58) Field of Classification Search
None
See application file for complete search history.

(56) References Cited

U.S. PATENT DOCUMENTS 8,001,403 B2 *   8/2011   Hamilton .............. G06F 1/3203
                                                   713/323
8,053,926 B2 *  11/2011   Lehmann .................. G06F 1/26
                                                   307/64
(Continued)

FOREIGN PATENT DOCUMENTS

CN    112667403 A    4/2021
CN    113094325 A    7/2021

OTHER PUBLICATIONS

Ganesh et al.; "Unleash Stranded Power in Data Centers with RackPacker"; Microsoft Research, 2009; (Ganesh_2009.pdf; pp. 1-7) (Year: 2009).*

(Continued)

*Primary Examiner* — Hiren P Patel
(74) *Attorney, Agent, or Firm* — Maginot, Moore & Beck LLP (57) ABSTRACT

This disclosure provides a resource tapping method, a resource tapping apparatus and an electronic device, and relates to the field of computer technology, in particular to the technical field of artificial intelligence, such as deep learning and machine learning. A specific implementation is as follows: obtaining operation data in M resource dimensions of a target cabinet, the M resource dimensions including a power resource, where M is a positive integer; determining a target power over-allocation value of the target cabinet based on the operation data, the target power over-allocation value being used for indicating an allowable power increment on the basis of a power rating of the target cabinet; and determining, based on the target power over-allocation value, a first quantity of additional servers deployable in the target cabinet.

12 Claims, 4 Drawing Sheets

(51) Int. Cl.
*G06F 1/3206* (2019.01)
*H05K 5/02* (2006.01)

(56) References Cited

U.S. PATENT DOCUMENTS

| | | | | |
|---|---|---|---|---|
| 8,315,841 | B2* | 11/2012 | Rasmussen | G06F 1/206 |
| | | | | 703/2 |
| 10,128,684 | B2* | 11/2018 | Ramamurthy | H02J 9/062 |
| 10,129,087 | B2* | 11/2018 | Bauer | H04L 67/52 |
| 11,003,239 | B2* | 5/2021 | Sinha | G06F 1/3225 |
| 11,216,059 | B2* | 1/2022 | Frias | G06F 9/4875 |
| 2007/0078635 | A1* | 4/2007 | Rasmussen | H05K 7/20836 |
| | | | | 703/1 |
| 2007/0174024 | A1* | 7/2007 | Rasmussen | H05K 7/20836 |
| | | | | 703/1 |
| 2009/0138313 | A1* | 5/2009 | Morgan | H05K 7/2079 |
| | | | | 705/7.23 |
| 2009/0309570 | A1* | 12/2009 | Lehmann | G06F 1/26 |
| | | | | 323/318 |
| 2010/0286955 | A1* | 11/2010 | VanGilder | G06Q 50/60 |
| | | | | 702/182 |
| 2011/0191773 | A1* | 8/2011 | Pavel | G06F 1/329 |
| | | | | 718/100 |
| 2012/0054527 | A1* | 3/2012 | Pfeifer | G06F 1/266 |
| | | | | 713/340 |
| 2012/0072745 | A1* | 3/2012 | Ahluwalia | G06F 1/26 |
| | | | | 713/340 |
| 2013/0238141 | A1* | 9/2013 | Shimizu | G06F 9/5094 |
| | | | | 700/276 |
| 2017/0220092 | A1* | 8/2017 | Kodama | G06F 1/3234 |
| 2019/0272016 | A1* | 9/2019 | Frias | G06F 9/5094 |
| 2019/0332164 | A1* | 10/2019 | Sinha | G06F 1/3225 |
| 2020/0089298 | A1* | 3/2020 | Lin | G06F 11/3058 |
| 2021/0100126 | A1* | 4/2021 | Li | G06F 1/28 |
| 2021/0405728 | A1* | 12/2021 | Jain | H05K 7/1487 |
| 2023/0092978 | A1* | 3/2023 | Chen | G06F 1/28 |
| | | | | 718/104 |

OTHER PUBLICATIONS

Li et al.; "A Scalable Priority-Aware Approach to Managing Data Center Server Power"; IBM; 2019 IEEE; DOI 10.1109/HPCA.2019.00067 (Li_2019.pdf; pp. 701-714) (Year: 2019).*
Machine English Translation of CN113094325A. (35 Pages).
Machine English Translation of CN112667403A. (26 Pages).

* cited by examiner

RESOURCE TAPPING METHOD, RESOURCE TAPPING APPARATUS AND ELECTRONIC DEVICE

CROSS-REFERENCE TO RELATED APPLICATION

The present application claims priority to the Chinese patent application No. 202111393506.X filed in China on Nov. 23, 2021, the disclosure of which is incorporated herein by reference in its entirety.

TECHNICAL FIELD

The present disclosure relates to the field of computer technology, in particular to the technical field of artificial intelligence, such as deep learning and machine learning, and specifically relates to a resource tapping method, a resource tapping apparatus and an electronic device.

BACKGROUND

Servers are the main power-consuming equipment in a data center, and power consumption thereof accounts for more than 70% of overall power consumption of the data center. Normal service operation is achieved through deploying a server in a cabinet of the data center.

Conventionally, the quantity of servers deployed in a cabinet of the data center is usually calculated in accordance with a power rating of the cabinet and a power rating of the servers, i.e., the quantity of servers deployable in the cabinet of the data center is obtained through dividing the power rating of the cabinet by the power rating of the servers. In addition, subsequent to deploying the servers in the cabinet of the data center, the cabinet powers the servers on the basis of its power rating.

SUMMARY

The present disclosure provides a resource tapping method, a resource tapping apparatus and an electronic device.

In one aspect, the present disclosure provides a resource tapping method, including: obtaining operation data in M resource dimensions of a target cabinet, the M resource dimensions including a power resource, where M is a positive integer; determining a target power over-allocation value of the target cabinet based on the operation data, the target power over-allocation value being used for indicating an allowable power increment on the basis of a power rating of the target cabinet; and determining, based on the target power over-allocation value, a first quantity of additional servers deployable in the target cabinet.

In another aspect, the present disclosure provides a resource tapping apparatus, including: an obtaining module, configured to obtain operation data in M resource dimensions of a target cabinet, the M resource dimensions including a power resource, where M is a positive integer: a first determination module, configured to determine a target power over-allocation value of the target cabinet based on the operation data, the target power over-allocation value being used for indicating an allowable power increment on the basis of a power rating of the target cabinet; and a second determination module, configured to determine, based on the target power over-allocation value, a first quantity of additional servers deployable in the target cabinet.

In yet another aspect, the present disclosure provides an electronic device, including: at least one processor; and a memory communicatively connected to the at least one processor, wherein the memory stores therein an instruction configured to be executed by the at least one processor, and the at least one processor is configured to execute the instruction, to implement the above-mentioned method.

In still yet another aspect, the present disclosure provides a non-transitory computer readable storage medium, storing therein a computer instruction, wherein the computer instruction is configured to be executed by a computer to implement the above-mentioned method.

In still yet another aspect, the present disclosure provides a computer program product, including a computer program, wherein the computer program is configured to be executed by a processor, to implement the above-mentioned method.

It is understood, this summary is not intended to identify key features or essential features of the embodiments of the present disclosure, nor is it intended to be used to limit the scope of the present disclosure. Other features of the present disclosure will become more comprehensible with reference to the following description.

BRIEF DESCRIPTION OF THE DRAWINGS

The drawings are merely used to facilitate a better understanding of the schemes in the embodiments of the present disclosure, and shall not be construed as limiting the present disclosure.

DETAILED DESCRIPTION

In the following description, numerous details of the embodiments of the present disclosure, which should be deemed merely as illustrative, are set forth with reference to accompanying drawings to provide a thorough understanding of the embodiments of the present disclosure. Therefore, those skilled in the art will appreciate that modifications or replacements may be made in the described embodiments without departing from the scope and spirit of the present disclosure. Further, for clarity and conciseness, descriptions of known functions and structures are omitted.

First Embodiment

Figure 1:
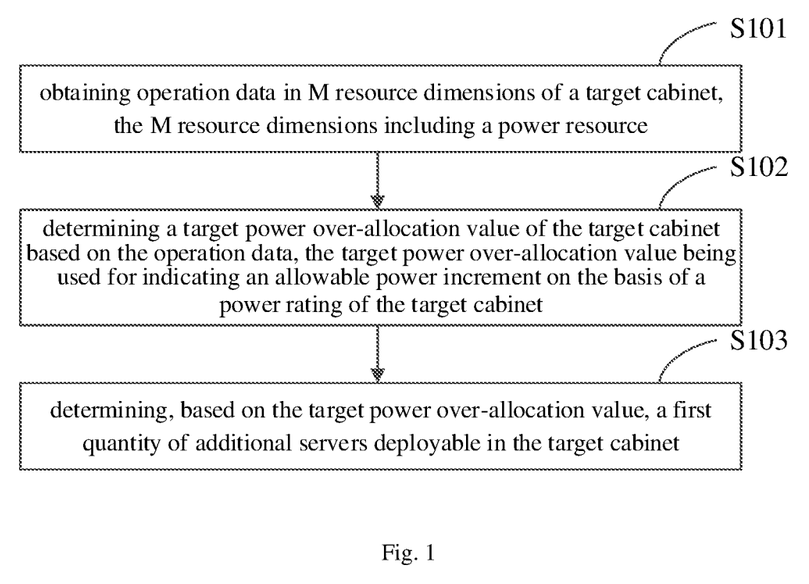
FIG. 1 is a flow chart of a resource tapping method according to a first embodiment of the present disclosure.

As shown in FIG. 1, the present disclosure provides a resource tapping method, which includes the following steps S101, S102 and S103.

Step S101: obtaining operation data in M resource dimensions of a target cabinet, the M resource dimensions including a power resource, where M is a positive integer.

In this embodiment, the resource tapping method relates to the field of computer technology, in particular to the technical field of artificial intelligence such as deep learning and machine learning, and the method may be widely applied to a server deployment scenario in a data center. The resource tapping method in the embodiment of the present disclosure may be implemented by a resource tapping apparatus in an embodiment of the present disclosure. The resource tapping apparatus in the embodiment of the present disclosure may be configured in any electronic device to execute the resource tapping method in the embodiment of the present disclosure. The electronic device may be a server or a terminal, which is not particularly limited herein.

In the step S101, an application scenario may be a data center, the data center may include at least one cabinet, and the target cabinet may be any cabinet in the data center. In this embodiment, the cabinet may be taken as a minimum unit, and corresponding resource tapping may be performed for each cabinet in the data center, so as to improve a resource usage rate of the data center in the case that infrastructure resources in the data center remain unchanged.

In order to achieve normal service operation, at least one server may be deployed in the target cabinet. In addition, the data center may further include a power supply device and a cooling device to maintain the normal operation of servers in the cabinet.

In order to maximize the utilization of power resource of the target cabinet, an operator usually deploys servers in the cabinet in advance based on the power rating of the cabinet and the power rating of the servers to be deployed, and operates the servers based on the power rating of the cabinet.

For example, the power rating of the cabinet is 8 kilowatts (KW) and the power rating of the servers is 800 watts (W), then it is calculated that 10 servers may be deployed, and the cabinet simultaneously operates the 10 servers at most to ensure that operation power of the cabinet does not exceed the power rating of the cabinet.

However, the operation power of the servers are generally less than the power rating of the servers. If the operation power of the servers are low, the power load of the cabinet is low, which generally leads to idle power resources in the cabinet. Therefore, on the premise of meeting the requirements of safety risk assessment, through resource tapping, it is able to allocate additional servers to the cabinet based on original deployment of the cabinet, thereby making full use of the resources in the data center.

Based on this, assuming that all servers operate at the power rating, the power load of the cabinet will exceed the power rating of the cabinet. On the basis of allocating additional servers in the cabinet, the electronic device will monitor operation of the resources of the cabinet in real time, to ensure that the power load of the cabinet will not exceed the power rating of the cabinet.

To be specific, operation data of the target cabinet in the M resource dimensions may be obtained, and the operation data may be used as an input to a resource tapping algorithm of the target cabinet. The operation data may include data of the target cabinet in a dimension of power resource, i.e., the operation data may include power load of the target cabinet, and the resource tapping is performed based on the power load of the target cabinet.

In order to more accurately evaluate the quantity of servers that may be additionally allocated in the target cabinet, in addition to the dimension of power resource, the M resource dimensions further include at least one of: an electricity resource; a cooling resource: a space resource: a network port resource; a usage rate of a central processing unit (CPU) of a server deployed in the target cabinet: or a usage rate of a graphics processing unit (GPU) of the server deployed in the target cabinet.

The operation data of the target cabinet in the dimension of electricity resource may refer to electrical energy source used in the operation of the target cabinet, and the target cabinet may be powered by a power supply device. The operation data of the target cabinet in the dimension of cooling resource may refer to cooling source used in the operation of the target cabinet, and the target cabinet may be cooled by a cooling device.

The operation data of the target cabinet in the dimension of space resource may refer to a space usage rate of the target cabinet. For example, if the target cabinet can accommodate 20 servers, and merely 10 servers are deployed currently, then the space usage rate is 50%. The operation data of the target cabinet in the dimension of network port resource may refer to a network port usage rate of the target cabinet.

In addition, the operation data of the target cabinet in the M resource dimensions may further include the usage rate of the CPU of the server deployed in the target cabinet, and the usage rate of the GPU of the server deployed in the target cabinet.

That is to say, in a possible implementation, a comprehensive evaluation may be made based on the power resource, electricity resource, cooling resource, space resource and network port resource, and resource tapping may be performed based on the evaluation in combination with the usage rates of CPU and GPU of the servers, so as to improve accuracy of the resource tapping.

The operation data of the target cabinet in the M resource dimensions may be automatically obtained in real time or periodically, or the operation data of the target cabinet in the M resource dimensions may be obtained in response to receiving trigger information, e.g., triggered by a user.

In addition, there are many ways to obtain the operation data of the target cabinet in the M resource dimensions. For example, an operation condition of the target cabinet may be monitored through a data center big data monitoring platform, to obtain the operation data of the target cabinet in the M resource dimensions; or the operation data of the target cabinet in the M resource dimensions may be received from other electronic devices.

Step S102: determining a target power over-allocation value of the target cabinet based on the operation data, the target power over-allocation value being used for indicating an allowable power increment on the basis of a power rating of the target cabinet.

In the step S102, the target power over-allocation value may refer to a power magnitude which can be additionally allocated to the target cabinet on the basis of the power rating. For example, supposing the target power over-allocation value is 2 kW and the power rating of the target cabinet is 8 kW, based on the target cabinet's rated power load of 8 KW, a rated power load of 2 kW may be additionally allocated to the target cabinet, and ultimately the target cabinet may be allocated with a rated power load of 10 kW.

Based on the operation data, the potential of the target cabinet may be evaluated, and the capacity of the target cabinet for deploying servers may be explored, to determine the target power over-allocation value of the target cabinet.

To be specific, through formulating a tapping identification algorithm, whether the target cabinet has potential to tap as well as the target power over-allocation value of the target cabinet in case that it has the potential can be comprehensively evaluated based on the operation data of the M resource dimensions which include the power load of the target cabinet, the usage rate of the CPU and GPU of the deployed server, electricity capacity, cooling capacity, etc. The target power over-allocation value is usually a value greater than 0, and may be less than the power rating of the target cabinet.

The target power over-allocation value of the target cabinet may be determined based on the operation data by using a deep learning model or a machine learning model. Taking a machine learning model as an example, logistic regression may be performed on tapping sample data based on the tapping identification algorithm, offline learning is performed, and after training a tapping identification model is obtained. The tapping identification model is a machine learning model, and its specific training process will be described hereinafter. The tapping sample data may include first historical operation data of a cabinet sample in the M resource dimensions and a power over-allocation label of the cabinet sample. In addition to the above data, the tapping sample data may further include second historical operation data of a rack row sample and a computer room sample corresponding to the cabinet sample. In addition, the tapping sample data may further include a cabinet type.

Subsequently, the operation data of the target cabinet in the M resource dimensions may be input to the tapping identification model for performing resource tapping of the target cabinet. Correspondingly, the tapping identification model performs tapping calculation based on learned parameters, so as to output the target power over-allocation value of the target cabinet.

In the case that the comprehensive evaluation is performed using the tapping identification model and based on the power, electricity, cooling, space and network port resources of the target cabinet, and the resource tapping is performed based on the evaluation in combination with the usage rate of the CPU of the server and the usage rate of the GPU of the server, the target power over-allocation value of the target cabinet is determined taking into account margins of resources such as electricity, cooling, space and network port, as well as historical operation pattern (including historical peak value and average value of power load of the target cabinet, and historical usage condition of an electricity resource and a cooling resource) of the target cabinet, current power load of the target cabinet, and the usage rate of the CPU and GPU of the deployed server, thus multiple factors are fully considered, thereby improving the accuracy of resource tapping on the premise that the safety risk assessment is passed.

Step S103: determining, based on the target power over-allocation value, a first quantity of additional servers deployable in the target cabinet.

In the step S103, the target power over-allocation value may be divided by the power rating of the servers to be deployed, then the resultant quotient is rounded down, and the integer value obtained from the rounding down may be determined as the first quantity, and the servers to be deployed may be arranged in accordance with service requirements.

For example, if the target power over-allocation value is 2 kW and the power rating of the servers to be deployed is 800 W, then a rounded-down integer value obtained by dividing the target power over-allocation value by the power rating of the servers to be deployed is 2. As a result, two additional servers may be deployed in the target cabinet.

If the target power over-allocation value is determined through fully considering factors such as the electricity resource, the cooling resource, the space resource and the network port resource, then the obtained target power over-allocation value has passed the safety risk assessment, i.e., if the servers are additionally deployed in the target cabinet based on the first quantity determined by the target power over-allocation value, it can be guaranteed that the electric power supply, the cooling, the space and the network port of the target cabinet meet the safety requirements.

When the target power over-allocation value is determined without considering factors such as the electricity resource, the cooling resource, the space resource and the network port resource, the first quantity of additional deployable servers may be comprehensively determined in consideration of these resource dimensions.

For example, the rounded-down integer value obtained by dividing the target power over-allocation value by the power rating of the servers to be deployed is 5. If, considering the electricity resource, the cooling resource, the space resource and the network port resource, the additional deployment of 5 servers cannot meet the safety requirements e.g., there are risks of overcurrent or exceedingly high temperature of the cabinet, or space and network port resources are insufficient, and existing resources in these dimensions of the target cabinet can merely support safe operation of 4 additional servers, then it may be determined that the first quantity of additional servers deployable in the target cabinet is 4.

Subsequently, a server deployment strategy of the data center may be determined based on the first quantity, and based on the server deployment strategy, a cabinet that can be additionally allocated with servers and the positions in the cabinet where additional servers can be deployed may be determined, then servers are additionally deployed in the cabinet, so as to fully utilize the resources in the data center, thereby improving the resource usage rate of the data center.

The server deployment strategy of the data center may be determined directly based on the first quantity. For example, for all cabinets in the data center, the server deployment strategy of the data center may be determined based on the quantity of additional servers deployable in each cabinet, and the server deployment strategy may include the quantity of additional servers deployable in each cabinet in the data center.

In one scenario, the cabinets in the data center are deployed in a rack row of the computer room, and the computer room may include a plurality of rack rows. The server deployment strategy of the computer room in the data center may be determined based on the first quantity after the overall safety risk assessment of the rack row and the computer room is passed. Otherwise, it is necessary to reduce the quantity of additional servers deployed in each cabinet in the data center, for example, to reduce the quantity of additional servers deployed in the target cabinet to be less than the first quantity, so as to pass the overall safety risk assessment of the rack rows and the computer room.

In addition, an actual demand for servers may further be considered when formulating the server deployment strategy, i.e., a service personnel may conduct evaluation and review in accordance with actual service. For example, the first quantity is 5 and the actual demand for servers is 4, then 4 servers may be additionally deployed to meet the service demand.

In this embodiment, through obtaining the operation data in M resource dimensions of a target cabinet, the M resource dimensions including a power resource; determining the target power over-allocation value of the target cabinet based on the operation data, the target power over-allocation value being used for indicating an allowable power increment on the basis of a power rating of the target cabinet; and determining, based on the target power over-allocation value, a first quantity of additional servers deployable in the target cabinet, it is able to determine the server deployment strategy of the data center based on the first quantity and deploy additional servers in the cabinet based on the server deployment strategy, so as to fully utilize the resources in the data center, thereby improving the resource usage rate of the data center.

Optionally, the target cabinet is deployed in a rack row of the computer room in the data center, and the method further includes: determining a server increase strategy for the computer room of the data center based on the first quantity, if both available resources in N resource dimensions of the rack row and available resources in the N resource dimensions of the computer room meet a predetermined condition. The predetermined condition includes: resources consumed by deployment of the first quantity of servers are within a range of available resources. The N resource dimensions include at least one of an electricity resource, a cooling resource, a space resource or a network port resource, where N is a positive integer.

In the implementation, the specific application scenario may be: one data center may include a plurality of computer rooms, each computer room may include a plurality of rack rows, each rack row may include a plurality of cabinets, and the target cabinet is deployed in a rack row of a computer room.

In the implementation, the server deployment strategy of the computer room in the data center may be determined based on the first quantity after the overall safety risk assessment of the rack row and the computer room is passed. To be specific, it is simulated that the first quantity of servers are deployed in the target cabinet, and if the resources consumed by the servers are within a range of available resources in the N resource dimensions of the rack row and within a range of available resources in the N resource dimensions of the computer room, it indicates that the overall safety risk assessment of the rack row and the computer room is passed, and the first quantity of servers may be additionally deployed in the target cabinet, thereby preventing the risk of large-scale overcurrent.

Alternatively, it is simulated that the first quantity of servers are deployed in the target cabinet, and if the resources consumed by the rack row are within a capacity range of resources in the N resource dimensions of the rack row, and resources consumed by the computer room are within a capacity range of resources in the N resource dimensions of the computer room, it indicates that the overall safety risk assessment of the rack row and the computer room is passed, and the first quantity of servers may be additionally deployed in the target cabinet.

For example, it is simulated that the first quantity of servers are deployed in the target cabinet, and if the rack row does not have overcurrent, does not exceed the rated power load, and the temperature of the rack row is within a predetermined range, and the computer room does not have overcurrent, does not exceed the rated power load, and the temperature of the computer room is within a predetermined range, it indicates that the overall safety risk assessment of the rack row and the computer room is passed, and the first quantity of servers may be additionally deployed in the target cabinet.

In this implementation, the server increase strategy of the computer room of the data center is determined based on the first quantity after the overall safety risk assessment of the rack row and the computer room is passed, thus, the resource usage rate of the data center is improved on the premise of ensuring the overall safety of the data center.

Optionally, the determining the target power over-allocation value of the target cabinet based on the operation data includes: inputting the operation data to a target model for performing a resource tapping operation to obtain the target power over-allocation value of the target cabinet. The target model is trained based on the following data: first historical operation data of a cabinet sample in the M resource dimensions, a power over-allocation label of the cabinet sample and second historical operation data of a rack row sample and a computer room sample corresponding to the cabinet sample.

In this implementation, the resource tapping of the cabinet may be performed by using a machine learning model. To be specific, the operation data may be input to a target model for performing a resource tapping operation to obtain the target power over-allocation value of the target cabinet. The target model is the tapping identification model, which is the machine learning model.

Prior to using the target model, it needs to be trained in advance. Training data of the target model may include the first historical operation data of the cabinet sample in the M resource dimensions, the power over-allocation label of the cabinet sample and the second historical operation data of the rack row sample and the computer room sample corresponding to the cabinet sample.

Figure 2:
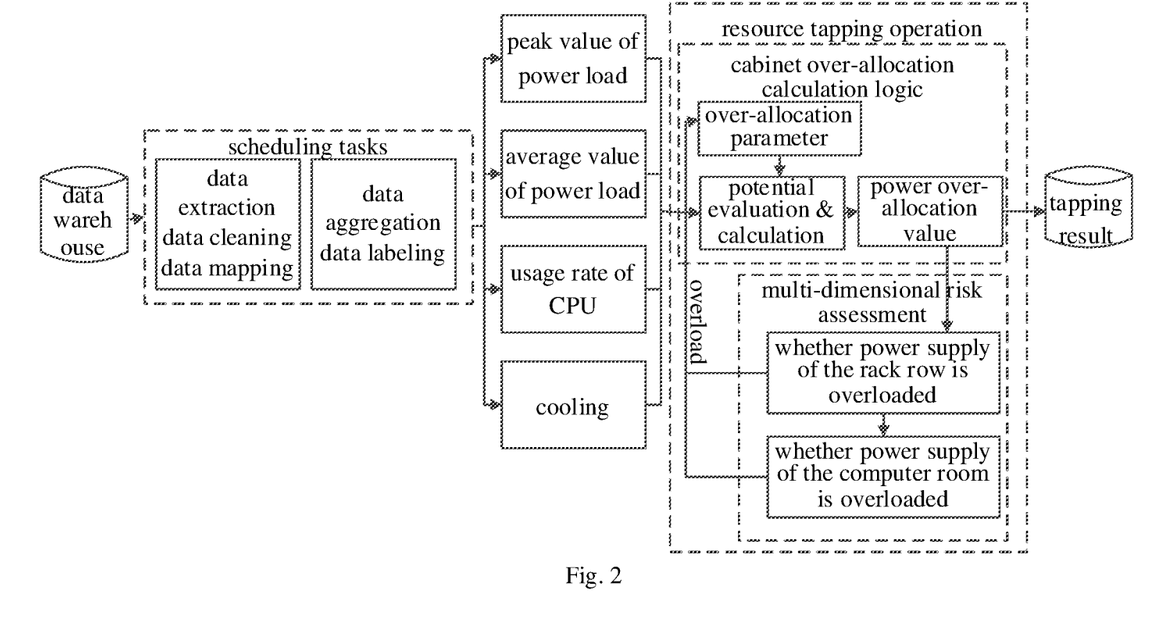
FIG. 2 is a schematic view showing a training process of a target model.

FIG. 2 shows a training process of the target model. The data center big data monitoring platform monitors the operation data of each data center, stores the historical operation data of each data center into a data warehouse, obtains the historical operation data of each data center in the data warehouse by scheduling tasks, obtains the first historical operation data of each cabinet sample in the data center in the M resource dimensions through data processing such as data extraction, data cleaning and data mapping, and then performs data aggregation to obtain the second historical operation data of the rack row sample and the computer room sample corresponding to the cabinet sample, and meanwhile performs data labeling processing to obtain the power over-allocation label of the cabinet sample.

In addition, after performing the data processing on the historical operation data monitored by the data center big data monitoring platform, a manual evaluation and review process may be added to ensure accuracy of training data obtaining.

The first historical operation data may include historical peak value and average value of power load, historical average value of usage rate of CPU and GPU, historical electricity usage condition, and historical cooling condition of the cabinet sample. The power over-allocation label may indicate whether the cabinet sample has potential to tap, and a corresponding power over-allocation value label when it has the potential. The second historical operation data may include the electricity usage condition and the cooling condition of the rack row, and the electricity usage condition and the cooling condition of the computer room.

The target model may be trained based on the above data. To be specific, for each cabinet sample, the tapping sample data of the cabinet sample may be input to the target model to perform the resource tapping operation, a tapping result of the cabinet sample is output, and the logistic regression is performed based on the tapping result and the power over-allocation label to adjust parameters of the target model. Thereafter, based on the second historical operation data, the overall safety risk assessment may be carried out from the rack row and computer room level upward in a level by level manner, to prevent the risk of large-scale overcurrent.

Correspondingly, after the target model training is completed, the operation data may be input to the target model to perform the resource tapping operation, so as to obtain the target power over-allocation value of the target cabinet.

In this implementation, the resource tapping of the target cabinet is performed through the machine learning model, and the machine learning model is trained based on the first historical operation data of the cabinet sample in the M resource dimensions, the power over-allocation label of the cabinet sample, and the second historical operation data of the rack row sample and computer room sample corresponding to the cabinet sample. In this way, it is able to achieve the resource tapping of the target cabinet on the premise of ensuring the overall safe operation of the data center.

Optionally, the target model includes an over-allocation parameter, the over-allocation parameter is used for controlling the power over-allocation value output by the target model, and the resource tapping operation includes: determining a first power over-allocation value based on the over-allocation parameter of the target model in case that it is determined based on the first historical operation data that the cabinet sample has resource tapping potential; and adjusting the over-allocation parameter of the target model to reduce the power over-allocation value output by the target model in case that it is determined based on the first power over-allocation value and the second historical operation data that the rack row sample and/or the computer room sample has safety risk.

In this implementation, the target model may include the over-allocation parameter and a potential evaluation and calculation module, the over-allocation parameter may be applied to the potential evaluation and calculation module to calculate the power over-allocation value of the cabinet, and the over-allocation parameter is used for controlling the power over-allocation value output by the target model, i.e., different over-allocation parameters lead to different respective calculated cabinet power over-allocation values.

As shown in FIG. 2, the resource tapping operation may include two parts. The first part may be a cabinet over-allocation calculation logic, which is used for determining based on the first historical operation data whether the cabinet sample has the resource tapping potential. In other words, the first historical operation data is input to the target model, and the target model determines, based on the over-allocation parameter and the potential evaluation and calculation module, whether the cabinet sample has the resource tapping potential. In the first part, if it is determined that the cabinet sample has the resource tapping potential, the first power over-allocation value may be determined based on the over-allocation parameter of the target model, and the over-allocation parameter may be adjusted based on the power over-allocation label and the first power over-allocation value output by the target model, such that the power over-allocation label and the power over-allocation value output by the target model are more and more close to each other.

The second part may be multi-dimensional risk assessment, which may perform multi-dimensional risk assessment of the rack row and the computer room based on the power over-allocation value output by the target model, and specifically may determine based on the second historical operation data whether the power supply to the rack row is overloaded and whether the power supply to the computer room is overloaded as well as whether the cooling of the rack row is overloaded and whether the cooling of the computer room is overloaded in the case that servers are additionally deployed in the target cabinet based on the power over-allocation value output by the target model. In case that it is determined based on the first power over-allocation value and the second historical operation data that the rack row sample and/or the computer room sample has safety risk, the over-allocation parameter of the target model is adjusted to reduce the power over-allocation value output by the target model, thereby ensuring the overall safe operation of the rack row and the computer room.

After the over-allocation parameter is adjusted, final tapping result of the cabinet sample may be output based on the adjusted over-allocation parameter.

In this implementation, in the training process of the target model, the risk assessment is carried out from the rack row and computer room level upward in a level by level manner on the basis of meeting the safe operation requirement of the cabinet, and in case that it is determined based on the first power over-allocation value and the second historical operation data that the rack row sample and/or the computer room sample has safety risk, the over-allocation parameter of the target model is adjusted to reduce the power over-allocation value output by the target model, so as to ensure the overall safe operation of the rack row and the computer room and prevent the risk of large-scale overcurrent, thereby the accuracy of resource tapping of the cabinet may be improved when the resource tapping is carried out based on the tapping identification model.

Optionally, subsequent to the determining, based on the target power over-allocation value, the first quantity of additional servers deployable in the target cabinet, the method further includes: monitoring a resource usage condition of the target cabinet in K resource dimensions if servers are deployed in the target cabinet based on the first quantity, the K resource dimensions including at least one of an electricity resource, a cooling resource or a power resource, where K is a positive integer; and generating feedback information if the resource usage condition indicates that resources used by the target cabinet in a target resource dimension of the K resource dimensions exceed a rated value of the target resource dimension, wherein the feedback information is used for adjusting the over-allocation parameter of the target model to reduce the power over-allocation value output by the target model.

In this implementation, in a scenario, the resource usage condition of the target cabinet in the K resource dimensions may be monitored in real time or periodically to determine the electricity usage condition, cooling condition, and power load condition of the target cabinet, and the feedback information may be generated if it is monitored that the target cabinet has overcurrent, the temperature is too high, or the power load is greater than a power rating.

In another scenario, the servers may be deployed in the target cabinet based on the first quantity, and after the servers are put on the rack, the resource usage condition of the target cabinet in the K resource dimensions may be monitored in real time or periodically to determine the electricity usage condition, cooling condition, and power load condition of the target cabinet. The feedback information may be generated if it is monitored that the target cabinet has overcurrent, the temperature is too high, or the power load is greater than the power rating. At the same time, some of the servers may be removed from the target cabinet, and services of the removed servers may be migrated to ensure the safe operation of the target cabinet.

Figure 3:
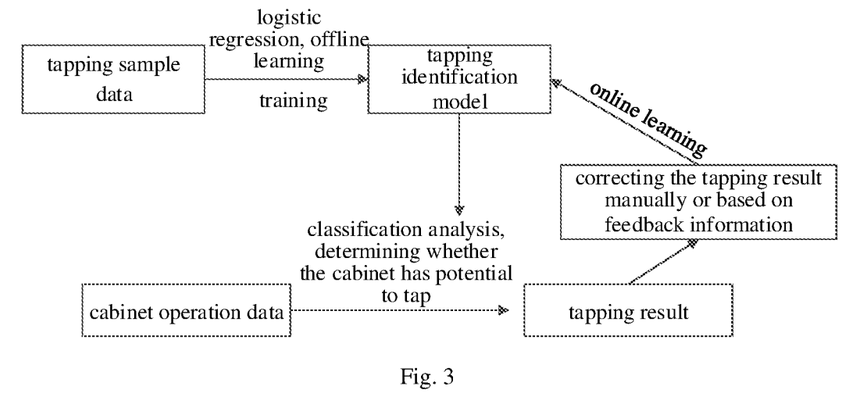
FIG. 3 is a schematic view showing an automatic learning process of a target model.

FIG. 3 shows an automatic learning process of the target model, which may specifically include: firstly, logistic regression is performed on the tapping sample data, offline learning is performed, and after training a tapping identification model is obtained, and then classification analysis is performed on the operation data of the cabinet based on the tapping identification model to determine whether the cabinet has potential to tap, so as to obtain the tapping result. After that, the tapping result is corrected manually, or online learning is performed on the tapping identification model based on the feedback information, so as to adjust the over-allocation parameter of the target model.

In this implementation, the resource usage condition of the target cabinet in the K resource dimensions is monitored, and the feedback information is generated if the resource usage condition indicates that resources used by the target cabinet in a target resource dimension of the K resource dimensions exceed a rated value of the target resource dimension, and the feedback information is used for adjusting the over-allocation parameter of the target model to reduce the power over-allocation value output by the target model. In this way, the online learning may be performed on the target model, thereby further improving the accuracy of resource tapping of the cabinet.

Figure 4:
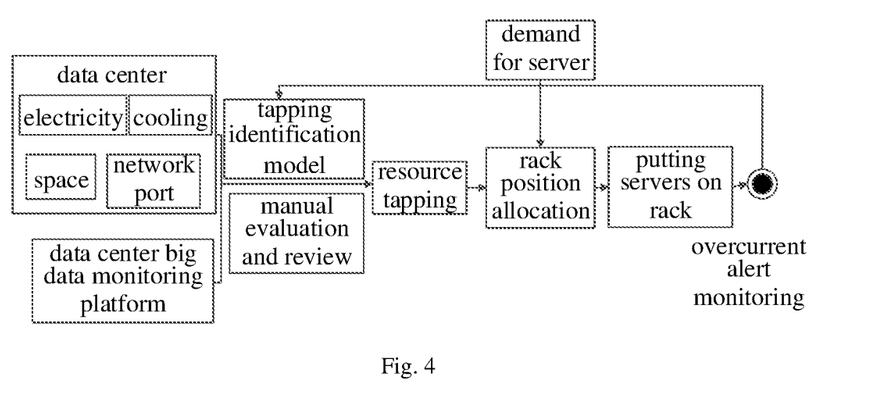
FIG. 4 is a schematic view showing an overall process of a resource tapping method.

An overall process of the resource tapping method in the embodiments of the present disclosure is set forth hereinafter. As shown in FIG. 4, the resource tapping process may specifically include two processes. The first process may be a training process of the tapping identification model, which may train the tapping identification model based on the data monitored by the data center big data monitoring platform and with the aid of manual evaluation and review.

The second process may be a process of performing the resource tapping based on the tapping identification model, wherein the operation data (including electricity, cooling, space and network ports) of the cabinet in the data center may be input to the tapping identification model for performing resource tapping to obtain the tapping result: servers may be deployed on rack positions of the cabinet based on the tapping result and the actual demand for servers, and the servers may be put on the racks; after the servers are put on the racks, the resource usage condition of the cabinet may be monitored, occurrence of overcurrent is monitored for producing overcurrent alert, and the feedback information may be generated, so as to adjust the over-allocation parameter of the tapping identification model.

Second Embodiment

Figure 5:
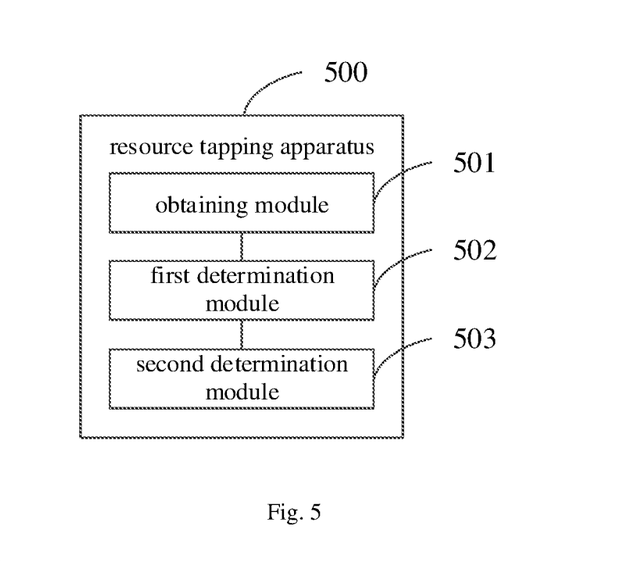
FIG. 5 is a schematic structural view showing a resource tapping apparatus according to a second embodiment of the present disclosure.

As shown in FIG. 5, the present disclosure provides a resource tapping apparatus 500, including: an obtaining module 501, configured to obtain operation data in M resource dimensions of a target cabinet, the M resource dimensions including a power resource, where M is a positive integer; a first determination module 502, configured to determine a target power over-allocation value of the target cabinet based on the operation data, the target power over-allocation value being used for indicating an allowable power increment on the basis of a power rating of the target cabinet; and a second determination module 503, configured to determine, based on the target power over-allocation value, a first quantity of additional servers deployable in the target cabinet.

Optionally, the target cabinet is deployed in a rack row of a computer room in a data center, the apparatus further includes: a third determination module, configured to determine a server increase strategy for the computer room of the data center based on the first quantity, in response to both available resources in N resource dimensions of the rack row and available resources in the N resource dimensions of the computer room meeting a predetermined condition, wherein the predetermined condition includes: resources consumed by deployment of the first quantity of servers are within a range of available resources, and the N resource dimensions include at least one of an electricity resource, a cooling resource, a space resource or a network port resource, where N is a positive integer.

Optionally, the first determination module 502 is specifically configured to: input the operation data to a target model for performing a resource tapping operation to obtain the target power over-allocation value of the target cabinet. The target model is trained based on the following data: first historical operation data of a cabinet sample in the M resource dimensions, a power over-allocation label of the cabinet sample, and second historical operation data of a rack row sample and a computer room sample corresponding to the cabinet sample.

Optionally, the target model includes an over-allocation parameter, the over-allocation parameter is used for controlling the power over-allocation value output by the target model, and the resource tapping operation includes: determining a first power over-allocation value based on the over-allocation parameter of the target model in case that it is determined based on the first historical operation data that the cabinet sample has resource tapping potential; and adjusting the over-allocation parameter of the target model to reduce the power over-allocation value output by the target model in case that it is determined based on the first power over-allocation value and the second historical operation data that the rack row sample and/or the computer room sample has safety risk.

Optionally, the apparatus further includes a monitoring module, configured to monitor a resource usage condition of the target cabinet in K resource dimensions in response to deploying servers in the target cabinet based on the first quantity, the K resource dimensions including at least one of an electricity resource, a cooling resource or a power resource, where K is a positive integer; and a generation module, configured to generate feedback information in response to the resource usage condition indicating that resources used by the target cabinet in a target resource dimension of the K resource dimensions exceed a rated value of the target resource dimension, and the feedback information is used for adjusting the over-allocation parameter of the target model to reduce the power over-allocation value output by the target model.

Optionally, the M resource dimensions further include at least one of: an electricity resource; a cooling resource: a space resource; a network port resource; a usage rate of a CPU of a server deployed in the target cabinet: or a usage rate of a GPU of the server deployed in the target cabinet.

The resource tapping apparatus 500 provided in embodiments of the present disclosure may achieve each process of the embodiments of the resource tapping method, and achieve the same beneficial effects, which will thus not be particularly defined herein.

According to the technical solutions in the embodiments of the present disclosure, the collection, storage, use, processing, transmission, provision and disclosure of user's personal information comply with provisions of relevant laws and regulations, and do not violate public order and good customs.

According to embodiments of the present disclosure, an electronic device, a readable storage medium and a computer program product are further provided.

Figure 6:
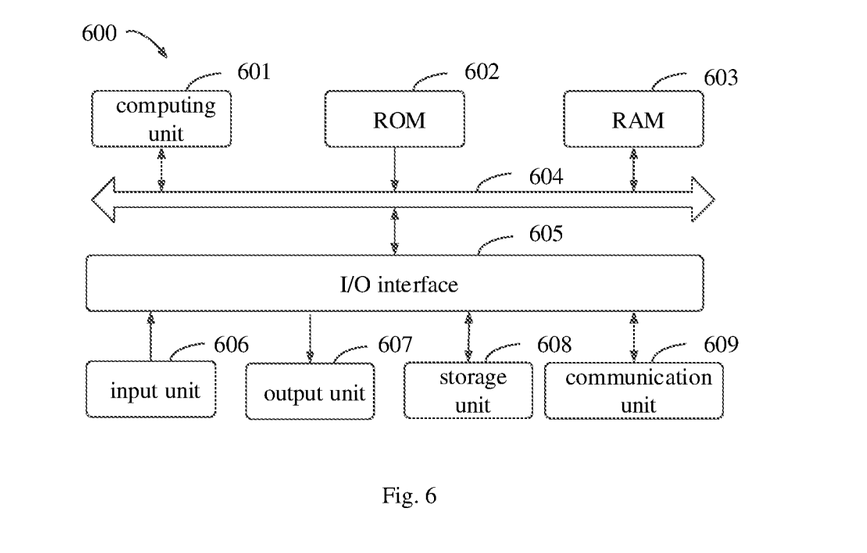
FIG. 6 is a block diagram of an electronic device configured to implement the embodiments of the present disclosure.

FIG. 6 is a schematic block diagram of an exemplary electronic device in which embodiments of the present disclosure may be implemented. The electronic device is intended to represent all kinds of digital computers, such as a laptop computer, a desktop computer, a work station, a personal digital assistant, a server, a blade server, a main frame or other suitable computers. The electronic device may also represent all kinds of mobile devices, such as a personal digital assistant, a cell phone, a smart phone, a wearable device and other similar computing devices. The components shown here, their connections and relationships, and their functions, are meant to be exemplary only, and are not meant to limit implementations of the present disclosure described and/or claimed herein.

As shown in FIG. 6, the device 600 includes a computing unit 601. The computing unit 601 may carry out various suitable actions and processes according to a computer program stored in a read-only memory (ROM) 602 or a computer program loaded from a storage unit 608 into a random access memory (RAM) 603. The RAM 603 may as well store therein all kinds of programs and data required for the operation of the device 600. The computing unit 601, the ROM 602 and the RAM 603 are connected to each other through a bus 604. An input/output (I/O) interface 605 is also connected to the bus 604.

Multiple components in the device 600 are connected to the I/O interface 605. The multiple components include: an input unit 606, e.g., a keyboard, a mouse and the like; an output unit 607, e.g., a variety of displays, loudspeakers, and the like; a storage unit 608, e.g., a magnetic disk, an optic disc and the like; and a communication unit 609, e.g., a network card, a modem, a wireless transceiver, and the like. The communication unit 609 allows the device 600 to exchange information/data with other devices through a computer network and/or other telecommunication networks, such as the Internet.

The computing unit 601 may be any general purpose and/or special purpose processing components having a processing and computing capability. Some examples of the computing unit 601 include, but are not limited to: a central processing unit (CPU), a graphics processing unit (GPU), various special purpose artificial intelligence (AI) computing chips, various computing units running a machine learning model algorithm, a digital signal processor (DSP), and any suitable processor, controller, microcontroller, etc. The computing unit 601 carries out the aforementioned methods and processes, e.g., the resource tapping method. For example, in some embodiments, the resource tapping method may be implemented as a computer software program tangibly embodied in a machine readable medium such as the storage unit 608. In some embodiments, all or a part of the computer program may be loaded and/or installed on the device 600 through the ROM 602 and/or the communication unit 609. When the computer program is loaded into the RAM 603 and executed by the computing unit 601, one or more steps of the foregoing resource tapping method may be implemented. Optionally, in other embodiments, the computing unit 601 may be configured in any other suitable manner (e.g., by means of a firmware) to implement the resource tapping method.

Various implementations of the aforementioned systems and techniques may be implemented in a digital electronic circuit system, an integrated circuit system, a field-programmable gate array (FPGA), an application specific integrated circuit (ASIC), an application specific standard product (ASSP), a system on a chip (SOC), a complex programmable logic device (CPLD), a computer hardware, a firmware, a software, and/or a combination thereof. The various implementations may include an implementation in form of one or more computer programs. The one or more computer programs may be executed and/or interpreted on a programmable system including at least one programmable processor. The programmable processor may be a special purpose or general purpose programmable processor, may receive data and instructions from a storage system, at least one input device and at least one output device, and may transmit data and instructions to the storage system, the at least one input device and the at least one output device.

Program codes for implementing the methods of the present disclosure may be written in one programming language or any combination of multiple programming languages. These program codes may be provided to a processor or controller of a general purpose computer, a special purpose computer, or other programmable data processing device, such that the functions/operations specified in the flow diagram and/or block diagram are implemented when the program codes are executed by the processor or controller. The program codes may be run entirely on a machine, run partially on the machine, run partially on the machine and partially on a remote machine as a standalone software package, or run entirely on the remote machine or server.

In the context of the present disclosure, the machine readable medium may be a tangible medium, and may include or store a program used by an instruction execution system, device or apparatus, or a program used in conjunction with the instruction execution system, device or apparatus. The machine readable medium may be a machine readable signal medium or a machine readable storage medium. The machine readable medium includes, but is not limited to: an electronic, magnetic, optical, electromagnetic, infrared, or semiconductor system, device or apparatus, or any suitable combination thereof. A more specific example of the machine readable storage medium includes: an electrical connection based on one or more wires, a portable computer disk, a hard disk, a random access memory (RAM), a read only memory (ROM), an erasable programmable read only memory (EPROM or flash memory), an optic fiber, a portable compact disc read only memory (CD-ROM), an optical storage device, a magnetic storage device, or any suitable combination thereof.

To facilitate user interaction, the system and technique described herein may be implemented on a computer. The computer is provided with a display device (for example, a cathode ray tube (CRT) or liquid crystal display (LCD) monitor) for displaying information to a user, a keyboard and a pointing device (for example, a mouse or a track ball). The user may provide an input to the computer through the keyboard and the pointing device. Other kinds of devices may be provided for user interaction, for example, a feedback provided to the user may be any manner of sensory feedback (e.g., visual feedback, auditory feedback, or tactile feedback); and input from the user may be received by any means (including sound input, voice input, or tactile input).

The system and technique described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the system and technique), or any combination of such back-end, middleware, or front-end components. The components of the system may be interconnected by any form or medium of digital data communication (e.g., a communication network). Examples of communication networks include a local area network (LAN), a wide area network (WAN) and the Internet.

The computer system may include a client and a server. The client and server are generally remote from each other and typically interact through a communication network. The relationship of client and server arises by virtue of computer programs running on respective computers and having a client-server relationship to each other. The server may be a cloud server, a server with a distributed system, or a server combined with a block chain.

It is appreciated, all forms of processes shown above may be used, and steps thereof may be reordered, added or deleted. For example, as long as expected results of the technical solutions of the present disclosure may be achieved, steps set forth in the present disclosure may be performed in parallel, performed sequentially, or performed in a different order, and there is no limitation in this regard.

The foregoing specific implementations constitute no limitation on the scope of the present disclosure. It is appreciated by those skilled in the art, various modifications, combinations, sub-combinations and replacements may be made according to design requirements and other factors. Any modifications, equivalent replacements and improvements made without deviating from the spirit and principle of the present disclosure shall be deemed as falling within the scope of the present disclosure.

What is claimed is:

1. A resource tapping method, comprising:
   obtaining operation data in M resource dimensions of a target cabinet, the M resource dimensions comprising a power resource, where M is a positive integer;
   determining a target power over-allocation value of the target cabinet based on the operation data, the target power over-allocation value being used for indicating an allowable power increment on the basis of a power rating of the target cabinet; and
   determining, based on the target power over-allocation value, a first quantity of additional servers deployable in the target cabinet;
   wherein the determining the target power over-allocation value of the target cabinet based on the operation data comprises:
   inputting the operation data to a target model for performing a resource tapping operation, to obtain the target power over-allocation value of the target cabinet; wherein
   the target model is trained based on following data: first historical operation data of a cabinet sample in the M resource dimensions, a power over-allocation label of the cabinet sample, and second historical operation data of a rack row sample and a computer room sample corresponding to the cabinet sample;
   wherein the target model comprises an over-allocation parameter, the over-allocation parameter is used for controlling the power over-allocation value output by the target model, and the resource tapping operation comprises:
   determining a first power over-allocation value based on the over-allocation parameter of the target model in case that it is determined based on the first historical operation data that the cabinet sample has resource tapping potential; and
   adjusting the over-allocation parameter of the target model to reduce the power over-allocation value output by the target model in case that it is determined based on the first power over-allocation value and the second historical operation data that at least one of the rack row sample or the computer room sample has safety risk.

2. The resource tapping method according to claim 1, wherein the target cabinet is deployed in a rack row of a computer room in a data center, and the method further comprises:
   determining a server increase strategy for the computer room of the data center based on the first quantity, in response to both available resources in N resource dimensions of the rack row and available resources in the N resource dimensions of the computer room meeting a predetermined condition; wherein
   the predetermined condition comprises: resources consumed by deployment of the first quantity of servers are within a range of available resources, and the N resource dimensions comprise at least one of an electricity resource, a cooling resource, a space resource or a network port resource, where N is a positive integer.

3. The resource tapping method according to claim 1, wherein subsequent to the determining, based on the target power over-allocation value, the first quantity of additional servers deployable in the target cabinet, the method further comprises:
   monitoring a resource usage condition of the target cabinet in K resource dimensions in response to deploying servers in the target cabinet based on the first quantity, the K resource dimensions comprising at least one of an electricity resource, a cooling resource or a power resource, where K is a positive integer; and
   generating feedback information in response to the resource usage condition indicating that resources used by the target cabinet in a target resource dimension of the K resource dimensions exceed a rated value of the target resource dimension, wherein the feedback information is used for adjusting the over-allocation parameter of the target model to reduce the power over-allocation value output by the target model.

4. The resource tapping method according to claim 1, wherein the M resource dimensions further comprise at least one of: an electricity resource; a cooling resource; a space resource; a network port resource; a usage rate of a central processing unit (CPU) of a server deployed in the target cabinet; or a usage rate of a graphics processing unit (GPU) of the server deployed in the target cabinet.

5. An electronic device, comprising:
   at least one processor; and
   a memory communicatively connected to the at least one processor,
   wherein the memory stores therein an instruction configured to be executed by the at least one processor, and the at least one processor is configured to execute the instruction, to implement following steps:
   obtaining operation data in M resource dimensions of a target cabinet, the M resource dimensions comprising a power resource, where M is a positive integer;
   determining a target power over-allocation value of the target cabinet based on the operation data, the target power over-allocation value being used for indicating an allowable power increment on the basis of a power rating of the target cabinet; and
   determining, based on the target power over-allocation value, a first quantity of additional servers deployable in the target cabinet;
   wherein the determining the target power over-allocation value of the target cabinet based on the operation data comprises:

inputting the operation data to a target model for performing a resource tapping operation, to obtain the target power over-allocation value of the target cabinet; wherein the target model is trained based on following data: first historical operation data of a cabinet sample in the M resource dimensions, a power over-allocation label of the cabinet sample, and second historical operation data of a rack row sample and a computer room sample corresponding to the cabinet sample;

wherein the target model comprises an over-allocation parameter, the over-allocation parameter is used for controlling the power over-allocation value output by the target model, and the resource tapping operation comprises:

determining a first power over-allocation value based on the over-allocation parameter of the target model in case that it is determined based on the first historical operation data that the cabinet sample has resource tapping potential; and adjusting the over-allocation parameter of the target model to reduce the power over-allocation value output by the target model in case that it is determined based on the first power over-allocation value and the second historical operation data that at least one of the rack row sample or the computer room sample has safety risk.

6. The electronic device according to claim 5, wherein the target cabinet is deployed in a rack row of a computer room in a data center, and the at least one processor is configured to execute the instruction to implement following step:

determining a server increase strategy for the computer room of the data center based on the first quantity, in response to both available resources in N resource dimensions of the rack row and available resources in the N resource dimensions of the computer room meeting a predetermined condition; wherein the predetermined condition comprises: resources consumed by deployment of the first quantity of servers are within a range of available resources, and the N resource dimensions comprise at least one of an electricity resource, a cooling resource, a space resource or a network port resource, where N is a positive integer.

7. The electronic device according to claim 5, wherein subsequent to the determining, based on the target power over-allocation value, the first quantity of additional servers deployable in the target cabinet, the at least one processor is configured to execute the instruction to implement following steps:

monitoring a resource usage condition of the target cabinet in K resource dimensions in response to deploying servers in the target cabinet based on the first quantity, the K resource dimensions comprising at least one of an electricity resource, a cooling resource or a power resource, where K is a positive integer; and generating feedback information in response to the resource usage condition indicating that resources used by the target cabinet in a target resource dimension of the K resource dimensions exceed a rated value of the target resource dimension, wherein the feedback information is used for adjusting the over-allocation parameter of the target model to reduce the power over-allocation value output by the target model.

8. The electronic device according to claim 5, wherein the M resource dimensions further comprise at least one of: an electricity resource; a cooling resource; a space resource; a network port resource; a usage rate of a central processing unit (CPU) of a server deployed in the target cabinet; or a usage rate of a graphics processing unit (GPU) of the server deployed in the target cabinet.

9. A non-transitory computer readable storage medium, storing therein a computer instruction, wherein the computer instruction is configured to be executed by a computer, to implement following steps:

obtaining operation data in M resource dimensions of a target cabinet, the M resource dimensions comprising a power resource, where M is a positive integer;

determining a target power over-allocation value of the target cabinet based on the operation data, the target power over-allocation value being used for indicating an allowable power increment on the basis of a power rating of the target cabinet; and determining, based on the target power over-allocation value, a first quantity of additional servers deployable in the target cabinet;

wherein the determining the target power over-allocation value of the target cabinet based on the operation data comprises:

inputting the operation data to a target model for performing a resource tapping operation, to obtain the target power over-allocation value of the target cabinet; wherein the target model is trained based on following data: first historical operation data of a cabinet sample in the M resource dimensions, a power over-allocation label of the cabinet sample, and second historical operation data of a rack row sample and a computer room sample corresponding to the cabinet sample;

wherein the target model comprises an over-allocation parameter, the over-allocation parameter is used for controlling the power over-allocation value output by the target model, and the resource tapping operation comprises:

determining a first power over-allocation value based on the over-allocation parameter of the target model in case that it is determined based on the first historical operation data that the cabinet sample has resource tapping potential; and adjusting the over-allocation parameter of the target model to reduce the power over-allocation value output by the target model in case that it is determined based on the first power over-allocation value and the second historical operation data that at least one of the rack row sample or the computer room sample has safety risk.

10. The non-transitory computer readable storage medium according to claim 9, wherein the target cabinet is deployed in a rack row of a computer room in a data center, and the computer instruction is configured to be executed by a computer, to implement following step:

determining a server increase strategy for the computer room of the data center based on the first quantity, in response to both available resources in N resource dimensions of the rack row and available resources in the N resource dimensions of the computer room meeting a predetermined condition; wherein the predetermined condition comprises: resources consumed by deployment of the first quantity of servers are within a range of available resources, and the N resource dimensions comprise at least one of an electricity resource, a cooling resource, a space resource or a network port resource, where N is a positive integer.

11. The non-transitory computer readable storage medium according to claim 9, wherein subsequent to the determining, based on the target power over-allocation value, the first quantity of additional servers deployable in the target cabinet, the computer instruction is configured to be executed by a computer, to implement following steps:

monitoring a resource usage condition of the target cabinet in K resource dimensions in response to deploying servers in the target cabinet based on the first quantity, the K resource dimensions comprising at least one of an electricity resource, a cooling resource or a power resource, where K is a positive integer; and     generating feedback information in response to the resource usage condition indicating that resources used by the target cabinet in a target resource dimension of the K resource dimensions exceed a rated value of the target resource dimension, wherein the feedback information is used for adjusting the over-allocation parameter of the target model to reduce the power over-allocation value output by the target model.

12. The non-transitory computer readable storage medium according to claim 9, wherein the M resource dimensions further comprise at least one of: an electricity resource; a cooling resource; a space resource; a network port resource; a usage rate of a central processing unit (CPU) of a server deployed in the target cabinet; or a usage rate of a graphics processing unit (GPU) of the server deployed in the target cabinet.

\* \* \* \* \*